Figure 1:
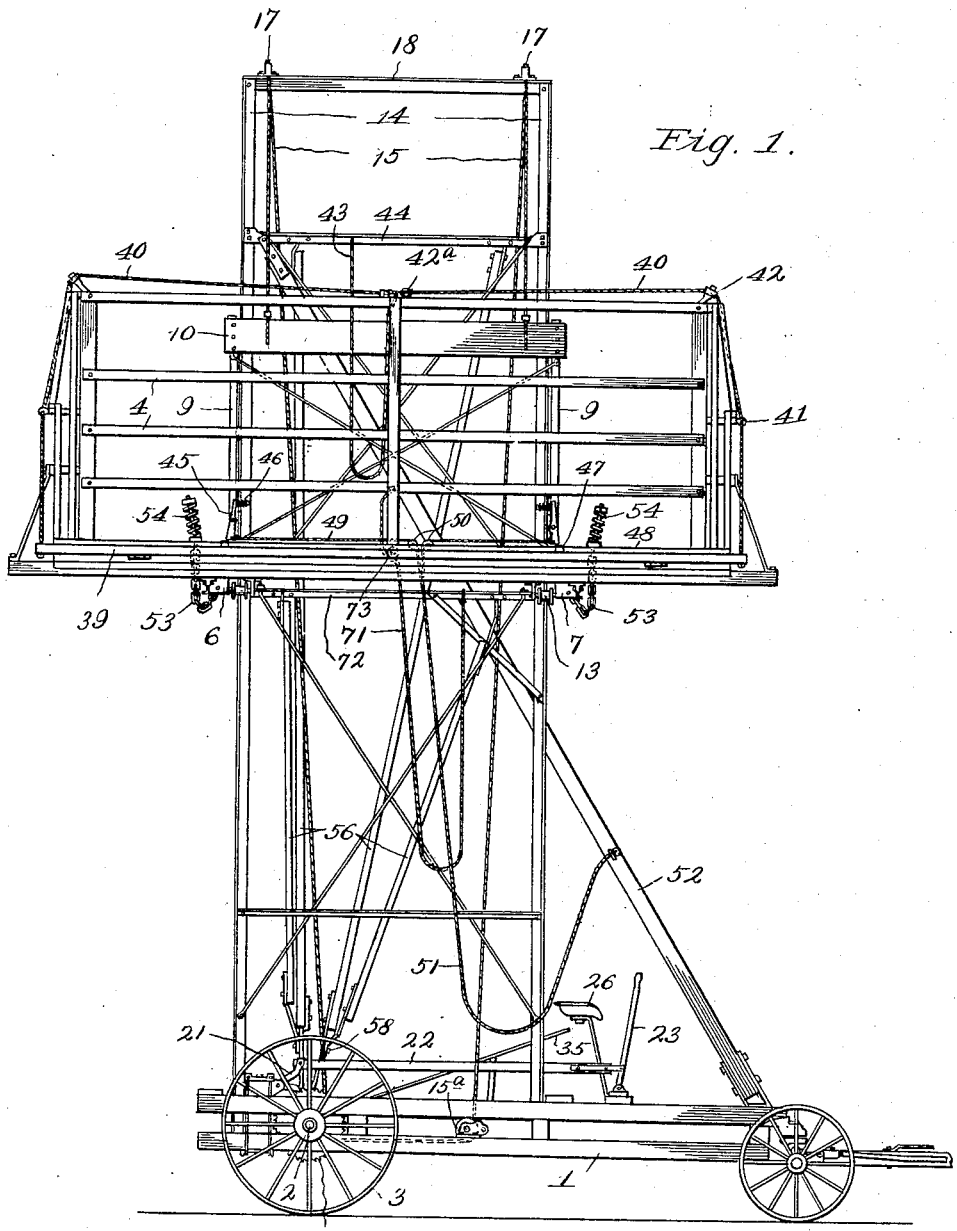

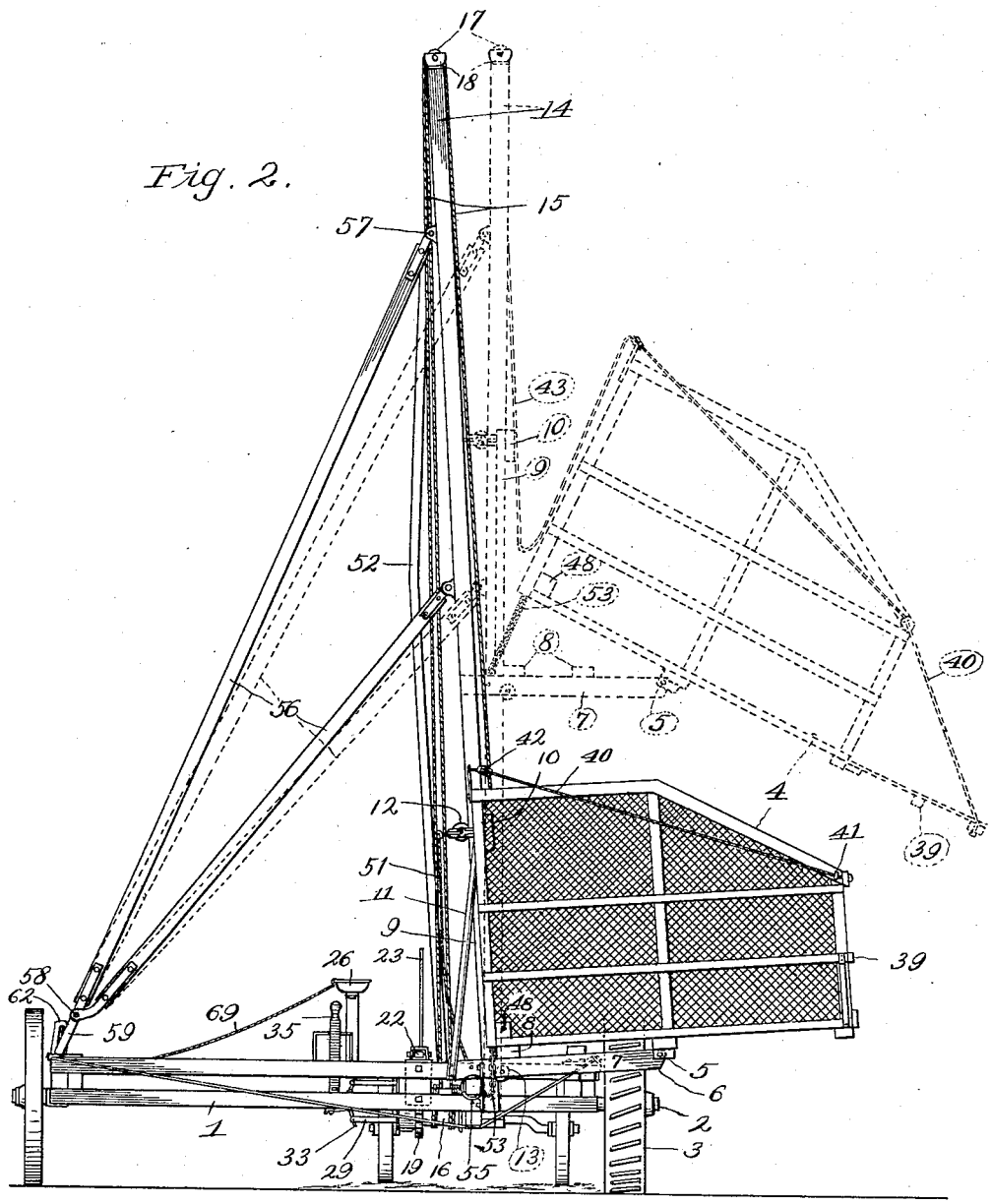

C. A. ROBBEN.
COMBINED GRAIN BARGE AND STACKER.
APPLICATION FILED AUG. 19, 1914.
1,171,656.
Patented Feb. 15, 1916.
4 SHEETS—SHEET 3.
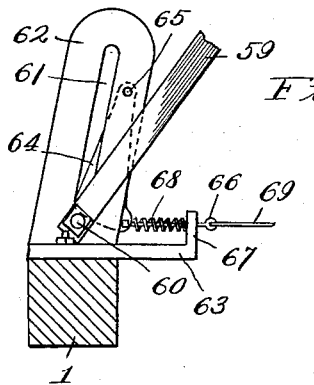
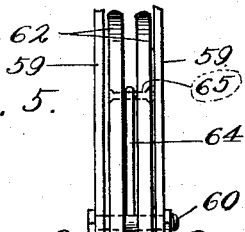
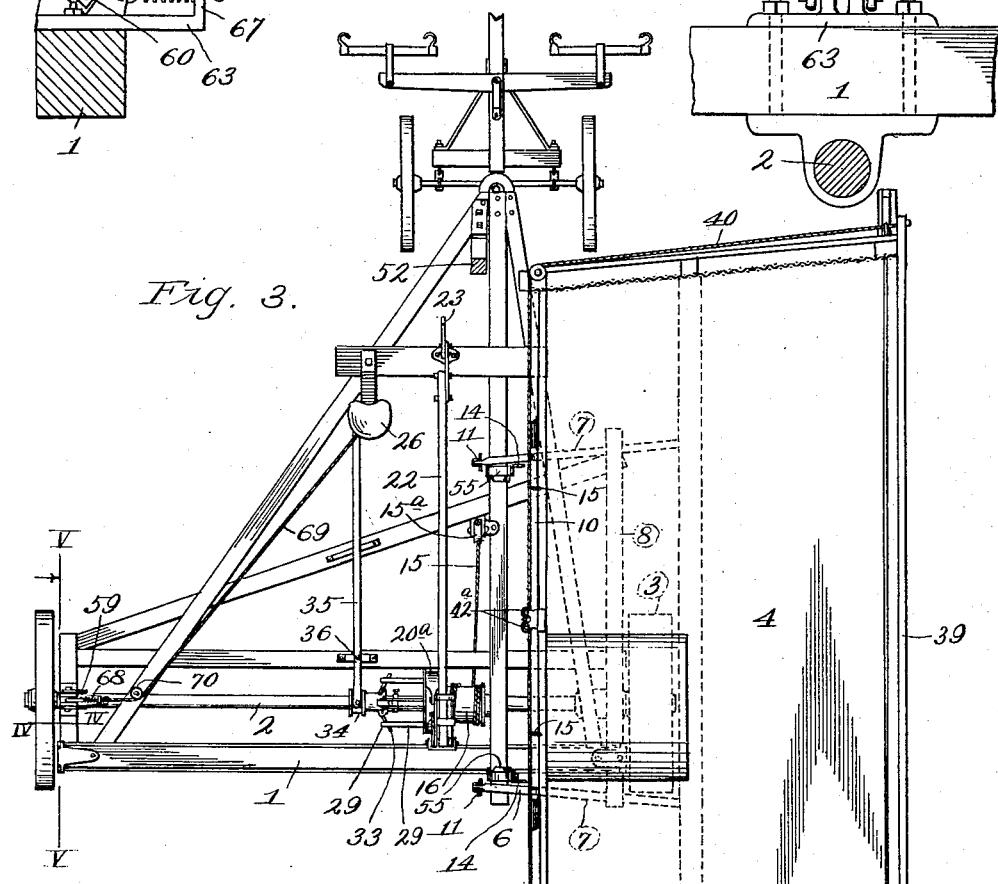
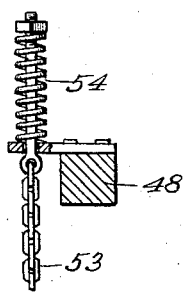
WITNESSES:
R. E. Hamilton
L. J. Fischer
INVENTOR:
Clemens A. Robben,
BY
F. G. Fischer,
ATTORNEY.
THE COLUMBIA PLANOGRAPH CO., WASHINGTON, D. C.

C. A. ROBBEN.
COMBINED GRAIN BARGE AND STACKER.
APPLICATION FILED AUG. 19, 1914.
1,171,656.
Patented Feb. 15, 1916.
4 SHEETS—SHEET 4.
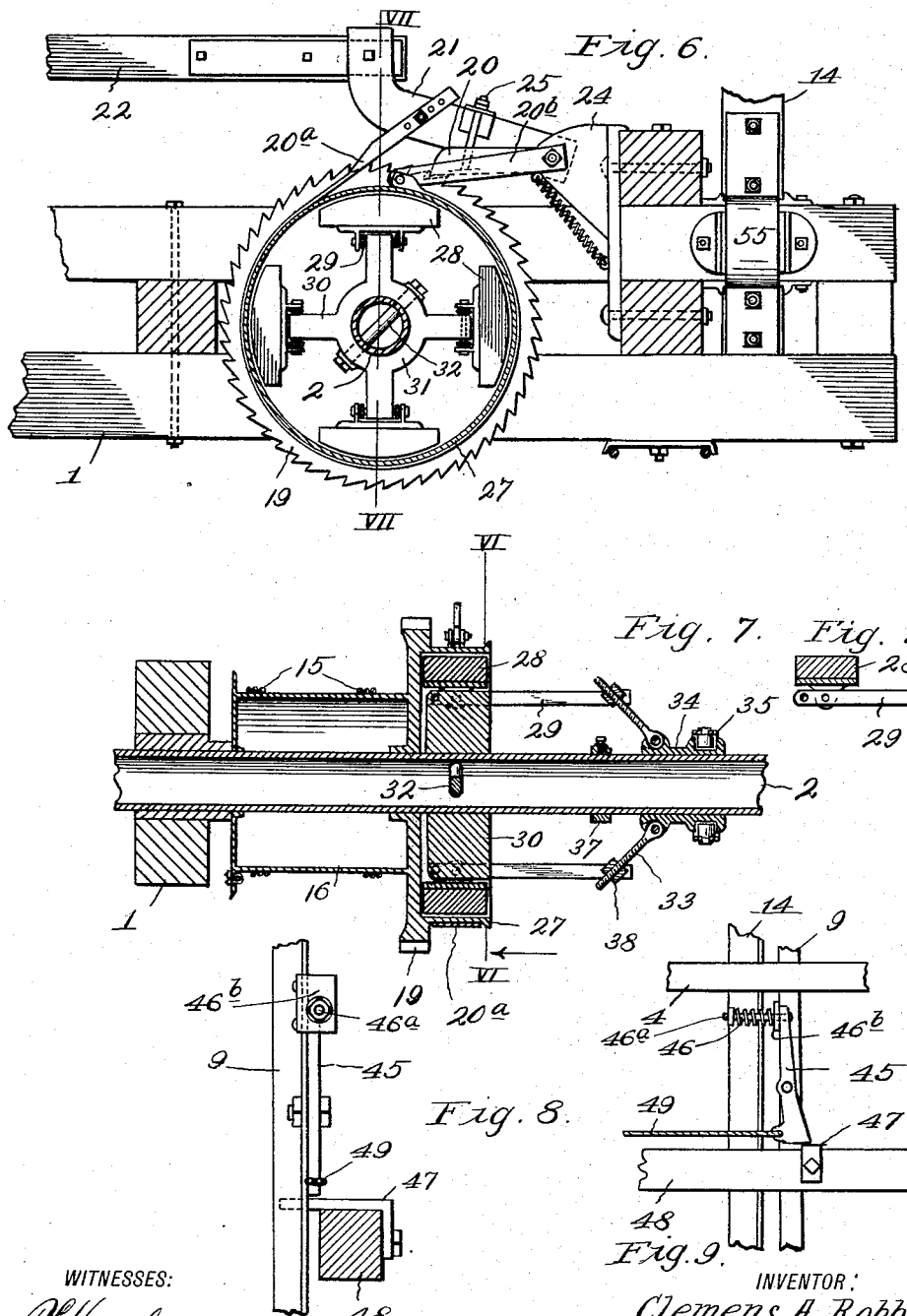
WITNESSES:
R. E. Hamilton
L. J. Fischer
INVENTOR:
Clemens A. Robben,
BY
F. G. Fischer,
ATTORNEY.

UNITED STATES PATENT OFFICE.

CLEMENS A. ROBBEN, OF NORTON, KANSAS.

COMBINED GRAIN BARGE AND STACKER.

1,171,656.  Specification of Letters Patent.  Patented Feb. 15, 1916.

Application filed August 19, 1914. Serial No. 857,508.

*To all whom it may concern:*

Be it known that I, CLEMENS A. ROBBEN, a citizen of the United States, residing at Norton, in the State of Kansas, have invented certain new and useful Improvements in Combined Grain Barges and Stackers, of which the following is a specification.

My invention relates to combined grain barges and stackers, and is an improvement over U. S. Letters Patent issued to Herman H. Robben and myself on the 24th day of June, 1913, and numbered 1,065,469.

The important features of the present invention reside: first, in balancing the barge upon its mountings, so that said barge may be restored to normal position after dumping with less effort than heretofore; second, in providing means whereby the gate at the delivery end of said barge is automatically opened and closed on the upward and downward movements, respectively, of said barge; third, in adjustably mounting the standards traversed by the barge, in such manner that they may be inclined rearwardly to throw the load closer to the center of gravity of the machine and thus overcome side draft and possible tipping of the machine while on the side of a hill; and fourth, in providing a clutch which may be thrown in gear without halting the machine, when it is desired to raise the barge preparatory to dumping the same.

The invention further resides in minor features coacting with those above enumerated to produce a more practical and easier controlled machine than heretofore.

In order that the invention may be fully understood, reference will now be made to the accompanying drawings, in which:

Figure 1 is a side elevation of the machine with the barge thereof raised preparatory to dumping, the wire fabric sides of said barge being omitted to show the construction of parts at the rear thereof. Fig. 2 is a rear elevation showing in full lines the standards inclined toward the center of gravity of the machine and the barge in lowered or loading position, and showing in dotted lines said standards swung to substantially a vertical position and the barge elevated and in a dumping position. Fig. 3 is a plan view of the machine with the standards in section. Fig. 4 is a cross section, enlarged on line IV—IV of Fig. 3. Fig. 5 is a section, enlarged, on line V—V of Fig. 3. Fig. 6 is a vertical section of the clutch mechanism and adjacent parts taken on line VI—VI of Fig. 7. Fig. 7 is a vertical section taken on line VII—VII of Fig. 6. Fig. 8 is a detail side elevation of a latch and adjacent parts to prevent accidental dumping of the barge. Fig. 9 is a front elevation of the parts disclosed by Fig. 8. Fig. 10 is a detail of part of the clutch mechanism. Fig. 11 is a detail of a shock absorber employed in carrying out the invention.

In carrying out the invention, I employ a wheeled-truck 1 embodying a rear axle 2 driven by a bull-wheel 3.

4 designates the barge which is self-dumping, said barge being mounted upon pivots 5 at the outer side of an elevator 6 consisting of two outwardly diverging beams 7, longitudinal beams 8, upwardly extending bars 9, a longitudinal beam 10 connecting the upper ends of said bars 9, and braces 11 extending upward from the inner ends of the beams 7 to the longitudinal beam 10.

The elevator 6 is provided at its upper and lower portions with antifriction rollers 12 and 13 arranged to traverse a pair of standards 14, the rollers 12 being arranged to transverse one side, while the rollers 13 are arranged to transverse the opposite side of the standards to hold the elevator 6 in proper relation thereto. The elevator 6 is raised and lowered through the intermediacy of a pair of cables 15, secured at their upper ends to the beam 10 and at their lower ends to a drum 16 loosely mounted upon the rear axle 2. In their passage from the beam 10 to the drum 16 said cables 15, pass over sheave wheels 17, mounted upon a transverse bar 18, connecting the upper ends of the standards 14. One of the cables 15 also passes around a guide sheave 15$^a$, in its passage to the drum 16. The drum 16 is provided at one end with a ratchet wheel 19, Figs. 6 and 7, engaged by a spring retracted pawl 20, to prevent accidental backward rotation of the drum 16 when the barge is in raised position preparatory to dumping.

When it is desired to allow the barge and the elevator to descend, the pawl 20 is thrown out of engagement with the ratchet wheel 19 through the intermediacy of a lever 21, a connecting bar 22, and a hand lever 23. The lever 21 is pivotally connected at its rear end to a bracket 24 secured to an adjacent portion of the truck frame, and said lever 21 is connected to the pawl 20 through the intermediacy of a bolt 25. The hand lever 23 is pivotally mounted near the forward end of the truck 1, so that it can be readily reached from the driver's seat 26. The clutch member 27, is embraced by a brake-band 20$^a$, adjustably secured at one end to the lever 21 and at its opposite end to an arm 20$^b$, Fig. 6, pivoted to the bracket 24. The ratchet wheel 19 is provided at one side with a friction clutch member 27 adapted to coact with clutch members 28, mounted upon levers 29, pivoted at one end to arms 30 radiating from a hub 31 rigidly secured to the axle 2 by a bolt 32, or other suitable means. The levers 29 are actuated to throw the clutch members 28 into and out of contact with the clutch member 27, through the intermediacy of threaded links 33 pivoted to a sleeve 34, slidable upon the axle 2 and controlled by a hand lever 35, fulcrumed to the truck frame at 36 and extending forwardly, so that it may be readily shifted from the driver's seat 26. A collar 37 is secured to the axle 2, between the hub 31 and the sleeve 34 to limit the movement of the latter toward the former. The threaded links 33 extend through nuts 38 connecting the levers 29 in pairs, so that said levers may be properly adjusted to take up wear of the clutch members.

On manipulating the lever 35 to throw the clutch members 28 into engagement with the clutch member 27, the drum 16 is caused to rotate and wind the cables 15 thereon, thus lifting the elevator 6 and the barge 4 to the desired dumping position. As the barge 4 ascends, its gate 39 is automatically released when its closing cables 40 become sufficiently slack to allow the pressure of the grain in the barge to open said gate. The cables 40 are attached to the upper end of the gate 39, pass through guides 41 on the upper forward portion of the barge, then around guide sheaves 42, 42$^a$, at the upper rear portion of the barge and are combined in a single cable 43 attached to a cross bar 44 connecting the standards 14. The cables 40 and 43 are of such length as to draw the gate 39 to closed position by the time the barge 4 reaches its lowermost position, as shown in full lines, Fig. 2.

The barge 4 overhangs the pivots 5 to automatically dump, but while ascending, said barge is prevented from accidentally dumping by a pair of latches 45 pivotally mounted upon the upwardly extending bars 9 of the elevator 6, said latches 45 being normally held by springs 46 in the path of keepers 47, secured to the lower rear bar 48 of the barge. The springs 46 embrace bolts 46$^a$, extending loosely through plates 46$^b$, secured to bars of the elevator 6, Figs. 8 and 9. When the barge has reached the desired height, it is permitted to dump by drawing the latches 45 out of the path of the keepers 47, which is accomplished by a pair of cables 49 connected to said latches and extending over guide sheaves 50, below which they are combined in a single cable 51, hanging down to within convenient reach of the driver and secured at its lower end to a brace 52, which assists in supporting the standards 14. The dumping movement of the barge 4 is restricted by a pair of chain cables 53, secured at one end to the rear portion of the barge 4 and at the opposite end to shock absorbers 54, Fig. 11, carried by the elevator 6.

The standards 14 have swiveled connections 55 at their lower ends with the truck frame, so that they may be swung to either the full or dotted line positions disclosed by Fig. 2. Said standards occupy the full line position when the barge 4 is being loaded or elevated, to avoid danger of over tipping the machine when driving along the side of a hill, but when the stack is reached the standards are swung to the dotted position to bring the barge over said stack in proper position for dumping. Pivotal movement of the standards is limited by a plurality of braces 56, connected at their upper ends to the standards by pivots 57 and connected in pairs at their lower portions by pivots 58. One brace of each pair has a downwardly extending strap 59, Figs. 4 and 5, connected at their lower ends by a bolt 60, slidable in slots 61 of a pair of brackets 62 connected by a base 63, secured to the top of the truck frame. Bolt 60 is normally held in the lower ends of the slots 61 by a latch 64, arranged between the brackets 62 to which it is pivotally connected at its upper end by a pin 65. The lower end of the latch 64 is pivotally connected to a link 66, extending through an opening in the upturned portion 67 of the bracket base 63 and encircled by a coil spring 68, interposed between the upturned portion 67 and the latch 64, to normally hold the latter over the bolt 60 to prevent it from moving upward in the slots 61.

69 designates a cable attached at one end to the link 66 and at its opposite end to the seat 26, so that it can be conveniently reached for the purpose of drawing the latch 64 out of the path of the bolt 60 when it is desired to allow the standards to swing to the dotted position disclosed by Fig. 2, they being drawn to such position by the weight of the barge 4 hanging at one side thereof. A guide pulley 70 is interposed between the seat 26 and the latch 64, for the cable 69 to run around.

The standards 14 are held from swaying backward or forward with respect to the truck 1 by the brace 52. Said brace 52 has its broad side presented to the standards 14 and is of such length as to yield sufficiently to allow the standards to swing to the full and dotted line positions, as above described.

In practice, the machine is driven beside a header until the barge 4 is loaded with grain, when it is driven to the stack. As the stack is approached, the lever 35 is manipulated to throw the clutch members 28 into engagement with the clutch member 27, which operation may be accomplished without stopping the progress of the machine. The engagement of the clutch members 27—28 rotates the drum 16, causing it to wind the cables 15 thereon and raise the elevator 6 with the barge 4. As the elevator and the barge ascend the cables 40 and 43 become slack and permit the gate 39 to be pushed open by the outward pressure of the grain within the barge 4. When the elevator and the barge have attained the desired height, the clutch members 28 and 27 are disengaged, after which the drum 16 is held from backward rotation by the pawl 20 and the ratchet wheel 19. Upon reaching the stack, the driver pulls the cable 69 to swing the latch 64 out of the path of the bolt 60 which moves upward in the slots 61, and allows the standards 14 to swing to the dotted position, Fig. 2, under the weight of the barge 4. The barge is then permitted to dump by disengaging the latches 45 from the keepers 47, which is accomplished by pulling upon the rope 51. After the barge has discharged its load upon the stack, the pawl 20 is thrown out of engagement with the ratchet wheel 19, so that the barge may descend by unwinding the cables 15 from the drum 16. As the pawl 20 is thrown out of engagement with the ratchet wheel 19 the band-brake 20$^a$ is brought into frictional engagement with the clutch member 27, which retards the backward rotation of the drum 16 and permits the barge 4 and the elevator 6 to slowly descend. As the barge 4 approaches the top of the truck 1, it is righted by a cable 71, attached at one end to the rear side of the barge and at its opposite end to a cross-bar 72 connecting the standards 14. Said cable 71 runs around a sheave 73 at the rear lower portion of the elevator. Said sheave takes up enough slack in the cable 71 to right the barge by the time the elevator descends to the truck 1. As the elevator contacts the top of the truck 1, the standards 14 are swung to the full line position, Fig. 2. When the standards 14 swing to the full-line position the bolt 60 passes beneath the latch 64 and prevents the standards from swinging to the dotted position again until said latch 64 is drawn out of the path of said bolt 60. As the barge descends, the cables 40 and 43 become taut and close the gate 39.

Having thus described my invention, what I claim and desire to secure by Letters Patent, is:

1. In a machine of the character described, a truck, standards mounted upon said truck, an elevator to traverse said standards, a barge dumpingly mounted upon said elevator, a cable attached to the barge for righting the same after dumping, and means on the elevator for automatically taking up slack in said cable.

2. In a machine of the character described, a truck, standards swingably mounted upon said truck, a barge arranged to traverse said standards, braces pivotally connected to said standards and adapted to swing therewith, a bolt connecting said braces, slotted brackets in which said bolt is adapted to move to allow the braces to move with the standards, and manually-controlled means to normally hold said bolt from movement in the slotted brackets.

3. In a machine of the character described, a truck, standards swingably mounted upon said truck, a barge arranged to traverse said standards, braces pivotally connected to said standards and adapted to swing therewith, a bolt connecting said braces, slotted brackets in which said bolt is adapted to move to allow the braces to move with the standards, a latch to normally hold said bolt from movement in the slotted brackets, and means for moving said latch out of the path of the bolt.

4. In a machine of the character described, a truck, standards swingably-mounted upon said truck, an elevator to traverse said standards, a barge dumpingly-mounted upon said elevator, a cable attached to the barge for righting the same after dumping, and a sheave on the elevator for automatically taking up slack in said cable.

In testimony whereof I affix my signature in the presence of two witnesses.

CLEMENS A. ROBBEN.

Witnesses:
 F. G. FISCHER,
 L. J. FISCHER.

Copies of this patent may be obtained for five cents each, by addressing the "Commissioner of Patents, Washington, D. C."